United States Patent [19]
Koberstein et al.

[11] 3,787,322
[45] Jan. 22, 1974

[54] CATALYST FOR PURIFICATION OF EXHAUST GASES FROM MOTOR VEHICLES AND INDUSTRIAL PLANTS

[75] Inventors: Edgar Koberstein, Alzenau; Eduard Lakatos, Hurth-Hermulhein, both of Germany

[73] Assignees: Laporte Industries Limited, London, England; Deutsche Gold- und Silber-Scheideanstalt vormals Roessler, Frankfurt, Germany

[22] Filed: Jan. 25, 1971

[21] Appl. No.: 109,617

Related U.S. Application Data

[63] Continuation-in-part of Ser. No. 827,136, May 23, 1969, abandoned, and a continuation-in-part of Ser. No. 523,564, Jan. 28, 1966, abandoned.

[52] U.S. Cl. .............................. 252/465, 423/213
[51] Int. Cl. ...................... B01f 11/06, B01f 11/22
[58] Field of Search ................ 252/465, 463; 23/2.2

[56] References Cited
UNITED STATES PATENTS

| | | | |
|---|---|---|---|
| 2,937,490 | 5/1960 | Calvert | 23/2 E |
| 3,072,458 | 1/1963 | Page | 23/2 E |
| 3,271,324 | 9/1966 | Stephens et al | 252/466 J |
| 3,669,906 | 6/1972 | Koberstein et al | 252/465 |
| 3,291,564 | 12/1966 | Krarby | 23/2 |
| 3,362,783 | 1/1968 | Leak | 23/2 |
| 2,963,448 | 12/1960 | Ray | 252/455 |
| 2,499,675 | 3/1950 | Owen | 252/465 |
| 2,952,644 | 9/1960 | Holden | 252/465 |
| 2,985,596 | 5/1961 | Pitzer | 252/465 |
| 2,204,619 | 6/1940 | Pier | 23/236 |
| 3,532,457 | 10/1970 | Koepernik | 23/2 |
| 3,317,439 | 5/1967 | Stiles | 252/455 |

*Primary Examiner*—Daniel E. Wyman
*Assistant Examiner*—W. J. Shine
*Attorney, Agent, or Firm*—Beveridge & Degrandi

[57] ABSTRACT

This invention provides a catalyst composition for use in oxidative reactions at high temperatures e.g., the oxidation of exhaust gases from internal combustion engines, which catalyst comprises an at least substantially homogeneous mixture of aluinium oxide of cubic structure (i.e., of the gamma series) oxide of copper and chromium, and optionally at least one compound of at least one other element of Group IIa of the Periodic Table, the proportion of the aluminium xoide being from 20 percent to 45 percent by weight of total catalyst weight, together with said at least one other compound, expressed as oxide, the mole ratio of copper oxide to chromium oxide in the oxide of copper and chromium, expressed as $CuO:Cr_2O_3$, being from 1.2:1 to 2.2:1, and the majority of oxide of copper and chromium being of a size of from 0.5 to $5\mu$. The invention also provides a process for making such a catalyst.

18 Claims, No Drawings

CATALYST FOR PURIFICATION OF EXHAUST GASES FROM MOTOR VEHICLES AND INDUSTRIAL PLANTS

CROSS-REFERENCES TO RELATED APPLICATIONS

This application is a continuation-in-part of application Ser. No. 827,136 filed on May 23, 1969 and now abandoned, which itself is a continuation-in-part of application Ser. No. 523,564 filed January 28, 1966 and now abandoned.

BACKGROUND OF THE INVENTION

This invention relates to an oxidation catalyst for use at high temperatures, particularly for use in the purification of exhaust gases issuing from motor vehicle engines and from industrial plant, and also relates to a method for the production of the catalyst. A catalyst designed to oxidise these harmful exhaust components and convert them into harmless carbon dioxide and steam before they are ejected into the air should, to be effective and viable commercially satisfy a number of apparently conflicting requirements, especially when it is used in motor vehicles. Firstly the catalyst should initiate the oxidation at as low a temperature as possible. Secondly the catalyst should convert a high percentage of the combustible substances into carbon dioxide and steam over the wide range of temperatures and rates of gaseous throughput involved. Thirdly it should be stable enough to retain activity over an extended period of use to avoid the need to replace the catalyst often. Fourthly it should be solid enough to endure the severe mechanical stresses and thermal variations occuring during extended periods of use. Lastly the catalyst should not be poisoned by compounds present in the exhaust gases, such as sulphur, phosphorus and lead, which are known to be catalyst poisons.

Catalysts containing aluminium oxide, copper oxide and chromium oxide vary in their suitability for use under the conditions described above depending on their composition and also by reason of process steps used in their manufacture which may not be apparent from the composition or construction of the catalysts so produced. In known catalysts containing alumina and oxides of copper and chromium, the alumina is a support, the oxides of copper and chromium being, for example, impregnated, absorbed or precipitated on the alumina. Many of such catalyst do not fulfill one or more of the requirements of a successful catalyst as stated above and particularly do not retain activity during extended periods of use particularly at high temperatures.

Experiments show that such carrier catalysts containing the usual amounts of heavy metal oxides (5 – 20 weight percent based on total catalyst weight) as well as catalysts as shown by U.S. Pat. No. 3,291,564 in the name of Kearby, which are impregnated with higher amounts of heavy metal oxides e.g., up to 37.5 percent based on the total catalyst weight failed high mileage automotive exhaust gas purification tests either due to fast solid state reactions between heavy metal oxide and carrier at temperature above 800°C or due to a reduction in mechanical strength caused by the conditions involved. Similar results are published in Canadian Pat. Nos. 662,382 and 662,383.

Catalysts comprising an alumina support having a copper oxide/chromium oxide coating generally do not meet the high temperature requirements which can be encountered in the catalytic after-combustion of motor vehicle exhaust gases. The following test was carried out to illustrate this.

A catalyst was prepared according to example 1 of U.S. Pat. No. 3,291,564 (Kearby). Alumina was mixed with aqueous solutions containing 5.0 mols $BaCl_2$ per 100 mols $Al_2O_3$. The wet pastes were dried an calcined 16 hours at 1,600° F. The $BaCl_2$ stabilised product was thoroughly washed with water. The analysis of the water-washed stabilised product showed a BaO- content of 3,8 percent BaO- content of 3,8 percent BaO in good accordance with the analysis given in table 1 of the above cited patent. The catalyst was made by impregnating these stabilised alumina with 30.4 percent $Cr_2O_3$, added as a $CrO_3$-Solution, and 20 percent CuO based on the weight of the stabilized $Al_2O_3$ carrier, to form thick pastes, which were then dried and calcined at 1,200° F for 6 hours.

This catalyst was subjected to the tests according to the "California Test Procedure and Criteria for the Motor Vehicle Exhaust Emission Control Board." The following results were obtained.

| Distance covered (Km) | Conversion of hydrocarbons after 4th deceleration |
|---|---|
| 0 | 90% |
| 5,000 | 77% |
| 10,000 | 70% |
| 20,000 | 37% |
| | Experiments discontinued. |

The figure of 37 percent hydrocarbon conversion is unsatisfactory and the catalyst would have to be replaced before this degree of deterioration had occurred.

Where the aluminium oxide acts merely as a support or carrier for increased amounts of heavy metal oxides, as in the catalyst tested above, the vibration of the vehicle and the intermittent pressure variations in the exhaust gases escaping from the engine may cause the essential bond between carrier and coating, to be ruptured. Such catalysts do not fulfil the mechanical requirements necessary for practical use.

To illustrate the decomposition of such catalyst under the effect of vehicle vibration and pressure variation alumina in tablet form (diameter 2 mm. height 3 mm.) was impregnated with copper salts and chromium salts from aqueous solutions and tempered up to a final temperature of 750° C. The catalyst then consisted of 55 percent by weight copper chromium oxides in a ratio of 2 $CuO/Cr_2O_3$ on an alumina support. The crushing strength of the original tablets was compared with that of the impregnated catalyst:

| | Crushing strength (Kp) |
|---|---|
| Original $Al_2O_3$ tablets | 10 – 13 |
| $Al_2O_3$ tablets with 55% by wt. Copper Chromium oxide | <1 |

The surface area of the types of carrier catalysts mentioned above is comparatively large. The same is true of catalysts described in the literature where a finely divided heavy metal component with particle sizes below for example, 1,000A is combined with an interspersing refractory material of the same particle size to separate heavy metal oxide catalyst crystallites and prevent crystallite growth.

The influence of the particle size of the heavy metal component is shown by the following tests.

The following catalysts X and X' were prepared.

Catalyst X The composition of Catalyst X was 30 percent w/w $Al_2O_3$, 70 percent w/w copper chrome oxide, $CuO:Cr_2O_3 = 1.5:1$ molar, $CuO.Cr_2O_3$ particle size within $1\mu-4\mu$ Catalyst X' This is catalyst X calcined at 1,000° C.

The following catalysts Y,Y',C,C' were prepared in accordance with the process described in the paragraph bridging columns 1 and 2 of page 1 of French Patent 1306846.

Catalyst Y The Composition of this catalyst is 30 percent w/w $Al_2O_3$, 70 percent w/w copper chrome oxide, $CuO:Cr_2O_3 = 1.5:1$ molar, $CuO:Cr_2O_3$ particle size within 500–1,000 A.

Catalyst Y' This is catalyst Y calcined at 1,000° C.

Catalyst C This is actually catalyst C as described in French Pat. No. 1,306,846. The composition is 50.2 percent w/w $Cr_2O_3$, 23.4 percent w/w MnO and 26.4 percent w/w CuO.

Catalyst C' This is catalyst C calcined at 1,000° C.

The following comparative tests were carried out on the above described catalyst. Temperature stability test.

Under working conditions the catalyst bed temperature, for example in use in automobile exhaust systems, has been found to rise above 1,000° C for short periods and the catalyst should therefore be able to retain efficiency under these conditions.

The test was exactly that described on page 2 of French Pat. No. 1,306,846 and the effectiveness of the catalyst was determined by the conversion of the gaseous consituents obtained and the temperature increase in the catalyst bed.

| Catalyst | Temperature increase in catalyst bed | Conversion% | | |
|---|---|---|---|---|
| | | $O_2$ | CO | $C_4H_{10}$ |
| X | 260 | 99 | 100 | 31 |
| X' | 290 | 90 | 100 | 29 |
| Y | 150 | 96 | 94 | 29 |
| Y' | 35 | 19 | 22 | 0 |
| C | 275 | 99 | 100 | 33 |
| C' | 15 | 3 | 0 | 12 |

Abrasion resistance test

Automobile exhaust catalysts are subjected to constant vibration resulting in abrasion. It is desirable that catalyst efficiency be retained under these conditions.

The test consisted in subjecting samples of the above described catalysts to roller mill action for 2 hours and fractionally sieving the resulting product.

| Catalyst | Abrasion % | | | |
|---|---|---|---|---|
| | Sieve fraction | | | Total |
| | <1000µ, | 300µ–1000µ, | 75µ–300µ | |
| X | 0.07 | 0.06 | 0.01 | 0.14 |
| Y | 7.72 | 70.59 | 5.15 | 83.46 |
| C | 4.33 | 7.13 | 0.20 | 11.66 |

It can be seen that the catalysts having a particle size of from 500 – 1,000 A surprisingly lost most of their activity on annealing and would therefore not withstand high temperature conditions in use. Catalysts X and X' are in accordance with the invention hereafter described and claimed.

The large surface areas usually found in carrier type catalysts also tend to retain larger amounts of lead compounds thereby encouraging reactions leading to catalyst poisoning and rapid deactivation. Another disadvantage of large surface area catalysts lies in the fact that extremely high temperatures are developed per volume unit of catalyst in case of unusually high concentrations of combustible compounds which can be caused in the operation of a vehicle engine for example by plug failure. Such high temperatures (above 1,500° C) may lead to the destruction of the complete purification unit as well as deactivation of the catalyst itself.

According to the present invention there is provided a catalyst composition, for oxidative reactions at high temperatures, comprising an at least substantially homogeneous mixture of aluminium oxide of the gamma series with oxide of copper and chromium, the aluminium oxide being present in from 20 to 45 percent of the total weight of the aluminium oxide and the oxide of copper and chromium, the mole ratio of copper oxide to chromium oxide in the oxide of copper and chromium, expressed as $CuO:Cr_2O_3$, being from 1.2:1 to 2.2:1, and the majority of oxide of copper and chromium being of a size of from 0.5 to $5\mu$.

The aluminium oxide component of the catalyst of the invention acts as a catalytically active binder and not as a carrier substance. Its effect on the catalytic properties of the catalytic system may be due to a partial formation of prephases, which contain many catalytic active centers. Using aluminium oxide as a carrier would result in a rapid consumption of the heavy metal oxide layer or impregnation, resulting in the formation of rather undisturbed spinel lattice the catalytic activity of which is much lower due to the lower number of active centers in undisturbed crystals. It is therefore a very important object of the invention to use the heavy metal component in the form of relatively course particles in a major amount with regard to the amount of aluminium oxide.

An interspersant effect of the aluminium oxide which would imply particle sizes of both heavy metal component and interspersant below 1,000 A is avoided in the catalysts of invention by using the coarse particles of oxide of copper and chromium (0.5 to $5\mu$). This for instance can be seen from the table of example 5 of this description of the invention where is shown that the growth of crystals is not a problem with the catalytic system of the invention, as smaller amounts of alumina lead to catalysts with increased thermal stability (see catalysts No. 1 – 4).

The invention also provides for preparing a catalyst composition which comprises the sequential steps of separately producing aluminium oxide, selected from the group consisting of aluminium oxide of the gamma series and aluminium oxide hydrate, and calcined powdered oxide of copper and chromium, selected from the group consisting of copper oxide in admixture with chromium oxide and copper oxide combined with chromium oxide, the mole ratio of copper oxide to chromium oxide, being from 1.2 to 2.2:1 and the particle size of the majority of the oxide of copper and chromium being in the range of 0.5 microns to 5.0 microns, forming a mixture selected from the group consisting of a mixture of said aluminium oxide and said oxide of copper and chromium, the aluminium oxide being present in from 20 to 45 percent of the total weight of aluminium oxide and oxide of copper and chromium and a mixture of said aluminium oxide, said oxide of copper and chromium and at least one other compound selected from the group consisting of oxides, chromites and chromates of beryllium, magnesium, calcium, strontium and barium, the aluminium oxide being present in from 20 to 45 percent of the total weight of aluminium oxide, oxide of copper and chromium and said other compound expressed as the oxide, and said other compound expressed as the oxide being present in not more than 5 percent by weight of said oxide of copper and chromium, drying the mixture, preferably at a temperature of 120°C, moulding the dried mixture and calcining the resulting moulded product at a temperature of from 700° to 1,000°C.

The alumina is preferably added as aluminium oxide hydrate. The oxide of copper and chromium is preferably calcined and then converted to powder form. In a preferred embodiment of the invention the oxide of copper and chromium contains an addition of a compound of Group IIa of the Periodic Table set forth on page B-3 of the 4th Edition of the "Handbook of Chemistry and Physics" published by the Chemical Rubber Company 1966, selected from the group consisting of beryllium, magnesium, calcium, strontium and barium and the compound is preferably selected from oxides, chromites and chromates of those metals.

A particularly preferred group IIa element is barium. The group IIa element is suitably introduced to the catalyst composition as an addition to the oxide of copper and chromium e.g., by coprecipitation. Preferably 0,5 – 5,0 weight percent (more preferably 0,5 to 3 percent weight percent) of the group IIa element, expressed as oxide and based on the weight of the oxide of copper and chromium, is added.

In carrying out the process of the invention the mixture containing aluminium oxide, oxide of copper and chromium and any other constituent specified, may be moulded with a known pressing agent, for example, graphite or stearic acid and formed into extrudates or tablets.

The copper oxide combined with chromium oxide is preferably selected from the group consisting of copper chromite, copper chromium spinel, and transition structures between copper chromite and copper chromium spinel.

The invention also provides a process for preparing a catalyst composition which comprises the sequential steps of separately producing an aluminium oxide hydrate press cake and calcined powdered oxide of copper and chromium selected from the group consisting of copper oxide in admixture with chromium oxide and copper oxide combined with chromium oxide the particle size of the majority of the oxide of copper and chromium being in the range of 0.5 microns to 5.0 microns and the oxide of copper and chromium preferably having a content of at least one other compound selected from the group consisting of oxides, chromites and chromates of beryllium, magnesium, calcium, strontium and barium, the quantity of said other compound expressed as the oxide being from 0.5 to 5.0 percent by weight of the oxide of copper and chromium and mole ratio of copper oxide to chromium oxide being from 1.2 to 2.2:1, mixing the aluminium oxide hydrate and the oxide of copper and chromium having a content of said other compound the aluminium oxide hydrate being present in from 20 to 45 percent by weight of the aluminium oxide, oxide of copper and chromium and said other compound expressed as the oxide if present, drying the mixture, grinding the mixture into particle sizes below $100\mu$, treating the ground mixture with an acid selected from the group consisting of mineral acids and aliphatic carboxylic acids, moulding the acid treated mixture and calcining it at a temperature in the range of 700° to 1,000°C.

The acid used in the process of the invention may be a mineral acid, for example, selected from the group consisting of hydrochloric and sulphuric acid and nitric acid (preferably nitric acid) or an aliphatic carboxylic acid for example, selected from the group consisting of lactic acid, citric acid, acetic acid and propionic acid (preferably acetic acid).

The quantity of acid may be from 5 – 100 ml/1 kg of ground product, preferably about 35 ml/1 kg of ground product when using a concentrated mineral acid, and 50 – 300 ml/1 kg of ground product, preferably about 100 ml/1 kg ground product when using a concentrated aliphatic carboxylic acid.

The aluminium oxide is conveniently obtained by calcining precipitated aluminium oxide hydrates comprising mainly boehmite and bayerite and crystallographically belongs to the gamma series.

The catalyst composition preferably contains less than 40 weight percent of aluminium oxide based on the weight of aluminium oxide and of the oxide of copper and chromium (together with said other compound if present) and optionally contains about 30 weight percent of aluminium oxide based on the weight of aluminium oxide and of the oxide of copper and chronium (together with said other compound if present).

The molar ratio of copper oxide (calculated as CuO) to chromium oxide (calculated as $Cr_2O_3$) in the oxide of copper and chromium is from 1.2:1 to 2.2:1, more preferably about 2:1. These ratios between copper and chromium are very critical with respect to the longtime performance of the catalyst and a low firing temperature.

When compound(s) or element(s) of group IIa of the Periodic Table are present the molar ratio of copper to chromium to group IIa element, all expressed as oxides is $CuO:Cr_2O_3:MeO = 1.2 - 2.2:1:0.01 - 0.1$, preferably 2:1:0.03. Me represents a group IIa element, preferably barium Said other compound is coprecipitated with the oxide of copper and chromium before the mixture of the oxide of copper and chromium and the aluminium oxide is formed.

In the catalyst of the invention the oxide of copper and chromium may comprise $CuCr_2O_4$ and $CuCrO_2$ and CuO and transition phases. The majority of oxide of copper and chromium may preferably be of a size of from 0.5 to $1\mu$.

Further in accordance with the invention there is provided a process for the oxidation of exhaust gases which comprises contacting the exhaust gases with a

Example 1

7 kg of a copper-chromium oxide powder, in the proportion 2 CuO to 1 $Cr_2O_3$ and containing 3.5 weight percent barium expressed as BaO were dried at 110° C calcined at 400° C and reduced to a grain size such that the material passed through a sieve with 10,000 holes/sq.cm. (i.e., 60$\mu$). Examination under an electromicroscope revealed that the majority of the oxide of copper and chromium had a size of from 0.5 to 5$\mu$. The material was then thoroughly mixed in a mixer with various proportions of an aluminium oxide having a grain size, but not a particle size, similar to the particle size of the copper-chromium oxide i.e., had been graded through a 10,000 holes/sq.cm. sieve (i.e., 60$\mu$). The proportions of copper-chromium-barium oxide to aluminium oxide were 70/30, 50/50 and 40/60 giving catalysts 1, 2 and 3 respectively. Each material was then poured into a kneading machine and sprayed with a fine spray of water until it could be easily kneaded. It was then dried in air at 120° C in a drying cupboard. After the dried mass had been reduced to a grain size of 0.1 to 1.5 mm. it was mixed in a drum with 400 g. of graphite, used as a pressing auxiliary. This mixture was conveyed to a press and pressed into tablets. The catalyst was then calcined stepwise up to a maximum temperature of 700° C. The copper-chromium oxide was then shown by X-rays to be in the form $CuCr_2O_4$ or $CuCrO_2$, as well as in other badly definable prephases. The catalyst showed high activity in all these structures.

Example 2

Catalyst 1 of Example 1, in a suitable apparatus was connected to the exhaust pipe of a motor vehicle and tested for 20,000 km in the street test laid down in the California Test Procedure and Criteria for Motor Vehicle Exhaust Emission Control Board. The vehicle was then continuously kept on the test under conditions as laid down by the regulations, including city traffic, and on main roads and motorways, and after every 5,000 km the vehicle was put on a dynamometer in accordance with the above regulations to examine the exhaust gases. On this stand, the vehicle was put through the driving cycle and the exhaust gases were continually analysed for hydrocarbons, carbon monoxide and carbon dioxide by means of infra red apparatus. The infra red apparatus for determining hydrocarbons was made sensitive with n-hexane. Other practical details of the measurements can be found in the regulations quoted. Below, is shown the degree of conversion of hydrocarbons, when the motor was decelerating, at which the highest concentrations of hydrocarbons occur.

After the exhaust gases have been treated, the concentration of carbon monoxide was below the permissible maximum in all cases. For comparison, the table shows examples of the decrease in activity of catalysts of similar composition, which contained less than 55 by weight percent of oxide of copper and chromium (catalyst 2 and 3 of Example 1). It can be seen that catalyst 1, according to the invention was considerably more stable.

Table

| Distance covered km | Conversion of hydrocarbons after 4th deceleration | | |
|---|---|---|---|
| | Catalyst 1 | Catalyst 2 | Catalyst 3 |
| 0 | 93% | 79% | 75% |
| 5.000 | 82% | 68% | 67% |
| 10.000 | 80% | 60% | 52% |
| 15.000 | 81% | experiment interrupted | experiment interrupted |
| 20.000 | 86% | experiment interrupted | experiment interrupted |

In the case of catalyst 1, the conversion of hydrocarbons was 72 percent and the carbon monoxide was 70 percent of the "final values" after 20,000 km calculated by the Californian evaluation method.

Example 3

The catalyst containing 70 percent and the catalyst containing 40 percent copper-chromium oxide/barium oxide according Example 1 were placed in suitable exhaust mufflers, attached to motor vehicles and the engines were started up. The Carburettors were adjusted so that a temperature of 1,000° C was maintained in the catalyst beds for several consecutive half-hour periods. The catalyst, used for comparison, with the smaller amount of copper-chromium oxide/barium oxide (40 percent) showed a steep fall in activity when tested on the dynamometer test stand, but the catalyst containing 70 percent copper-chromium oxide/barium oxide retained practically all its activity.

Example 4

Exhaust gas from a reaction chamber, which was contaminated with ammonia and small quantities of mercaptans, caused a very offensive smell in the neighbourhood. When this exhaust passed over a catalyst according to the present invention and containing more than 55 percent copper-chromium oxide, at a speed of 4,000 l. per hour an average temperature of 580° C was measured, resulting from the heat of combustion of the ammonia. The gases coming off the catalyst bed no longer gave off any smell, even in the immediate neighbourhood of the furnace.

Example 5

100 kg. of aluminium oxide hydrate press cake, corresponding to 6.8 kg of $Al_2O_3$ were mixed in a kneader with 16 kg of oxide of copper and chromium, dotated with barium expressed as BaO, in a molar ratio of 2 CuO:1 $Cr_2O_3$:0.03 BaO, for 3 hours to form a homogeneous pulp. The liquid pulp was dried overnight on hurdles at 120° C in the drying chamber and subsequently ground on a corundum disc mill to a max. grain size of 100$\mu$.

The ground product was then worked in a kneader to form an extrusible mass and moulded in an extrusion press to form mouldings with a diameter of approx. 2 mm. The following mixture was used:

| | |
|---|---|
| Ground product | 1.6 kg |
| HNO$_3$ (density 1.3) | 54 ml |
| Stearic acid | 60 g |
| Water | 580 ml. |

The mouldings were then dried overnight on hurdles at 120° C in a chamber oven, and subsequently heated over a period of 5 hours at rising temperature in a muffle furnace until a final temperature of 850° C was reached.

The obtained catalyst corresponds to Catalyst No. 4 in the following table.

The above procedure was then repeated using different proportions of alumina and oxide of copper and chromium to obtain catalyst 1, 2, 3 and 5 of the following table. The catalysts were then tested for abrasion, resistance to pressure and conversion of hydrocarbons in accordance with the street test laid down in the regulations "California Test Procedure and Criteria for Motor Vehicle Exhaust Emission Control Board" (see Example 2 for further details).

The results are set out in the following table.

press cake and oxide of copper and chromium, dotated with barium, expressed as BaO, in a molar ratio of 2 CuO:1Cr$_2$O$_3$:0.03 BaO.

The ground product was then worked in a kneader to form an extrusible mass and was moulded in an extrusion press to form mouldings with a diameter of approx. 2 mm. The following mixture containing now organic acid, was used:

| | |
|---|---|
| Ground product | 1.6 kg |
| Glacial acetic acid | 143 ml |
| graphite | 64 g |
| water | 520 ml. |

The mouldings were then processed as described in Example 5 to a ready for use catalyst. Subsequent testing for abrasion, crushing strenth and conversion of hydrocarbons in accordance with a street test corresponding to the regulations recited in Example 5 showed a catalytic performance which was comparable Table

| Catalyst Number | Wt. ratio oxide of copper chromium and barium/ aluminium oxide | Abrasion % | Crushing strength (kp) | Conversion HC% | Distance covered (km) |
|---|---|---|---|---|---|
| 1 | 30:70 | 0.52 | 5.5-10 | 89 | 0 |
| | | | | 69 | 8000 |
| | | | | 60 | 11500 |
| 2 | 50:50 | 1.65 | 3 - 8.5 | 95 | 150 |
| | | | | 73 | 4300 |
| | | | | 63 | 8700 |
| 3 | 60:40 | 1.75 | 2 - 6 | 91 | 150 |
| | | | | 95 | 3600 |
| | | | | 70 | 7500 |
| | | | | 64 | 11800 |
| | | | | 59 | 20200 |
| 4 | 70:30 | 1.91 | 1.5-3.6 | 93 | 0 |
| | | | | 89 | 4500 |
| | | | | 86 | 13000 |
| | | | | 90 | 18000 |
| | | | | 85 | 23000 |
| | | | | 79 | 50000 |
| 5 | 90:10 | 8.73 | <<1 | Too soft, total loss after 2000 km. | |

It can be seen from this table that catalysts Nos. 3 and 4 gave satisfactory results with catalyst No. 4 giving the best results. Although the test was, in accordance with the regulations of the "California Test Procedure and Criteria for Motor Vehicle Exhaust Emission Control Board," run with commercially leaded fuel there was still a very high catalytic performance to be observed after 50,000 km mileage, indicating the absence of lead poisoning of the catalyst. The catalyst retained an excellent mechanical stability, the loss over the whole test was less than 1 percent. Although at times quite high concentrations of combustible compounds in the exhaust gas occurred, no structural failure of the converter could be detected due to the novel property of the catalyst to prevent extremely high thermal gradient.

Example 6

According to Example 5 ground preproduct was made using the same amounts of aluminium hydrate to the performance of catalyst 4 of the foregoing table.

This Example shows, that organic acids instead of mineral acids can be used in the extrusible mass forming step with similar good effect on the catalytic and mechanical properties of the catalyst.

It is understood that besides acetic acid aliphatic carbonic acids in general for example lactic acid, propionic acid, and citric acid can be used. With respect to Example 5 it is noted that mineral acids in general as hydrochloric acid, nitric acid and sulphuric acid can be used in the extrusible mass forming step with a similar good effect. The use of acids in the above mentioned step is preferred for the development of sufficient strength of the resulting catalyst and therefore represents a very important embodiment within the invention.

We claim:

1. A process for preparing a catalyst composition, which comprises the sequential steps of:
   a. separately producing 1. aluminum oxide selected from the group consisting of
   i. aluminium oxide of the gamma form and
   ii. aluminium oxide hydrate, and
2. calcined powdered oxide of copper and chromium selected from the group consisting of
   i. copper oxide in physical admixture with chromium oxide, and
   ii. copper oxide chemically combined with chromium oxide, the mole ratio of copper oxide to chromium oxide being from 1.2 to 2.2:1 and the particle size of the majority of the oxide of copper and chromium being in the range of 0.5 microns to 5.0 microns,
b. forming a moist mixture selected from the group consisting of
   i. a mixture of said aluminium oxide and said oxide of copper and chromium, the aluminium oxide being present in from 20 to 45 percent of the total weight of aluminium oxide and oxide of copper and chromium, and
   ii. a mixture of said aluminium oxide, said oxide of copper and chromium and at least one other compound the other compound being selected from the group consisting of
      i. oxides, chromites and chromates of beryllium,
      ii. oxides, chromites and chromates of magnesium,
      iii. oxides, chromites and chromates of calcium,
      iv. oxides, chromites and chromates of strontium, and
      v. oxides, chromites and chromates of barium, the aluminium oxide being present in from 20 to 45 percent of the total weight of aluminium oxide, oxide of copper and chromium and said other compound expressed as the oxide, and said other compound expressed as the oxide being present in not more than 5 percent by weight of said copper and chromium,
c. drying the mixture,
d. moulding the dried mixture, and
e. calcining the resulting moulded product at a temperature of from 700° to 1,000° C.

2. A process as claimed in claim 1 wherein the mixture of aluminium oxide and oxide of copper and chromium also contains said at least one other compound and said other compound is selected from the group consisting of oxide, chromite and chromate of barium.

3. A process as claimed in claim 2 wherein said other compound is barium oxide and the mole ratio of copper, to chromium to barium, expressed oxides, is 1.2 to 2.2:1:0.01 to 0.1.

4. A process as claimed in claim 1 wherein aluminium oxide is present in the mixture in from 20 to 40 percent by weight.

5. A process as claimed in claim 1 wherein the dried mixture is ground into particle sizes below 100 microns and is treated with an acid selected from the group consisting of mineral acids and aliphatic carboxylic acids before calcination.

6. A process as claimed in claim 5 wherein the ground composition is treated with an acid selected from the group consisting of nitric acid, hydrochloric acid, sulphuric acid, acetic acid, citric acid and propionic acid.

7. A process as claimed in claim 5, wherein the quantity of acid is from 5 – 100 ml/1 kg of ground product, when using a concentrated mineral acid, and 50 – 300 ml/1 kg of ground product, when using a concentrated aliphatic carboxylic acid.

8. A process as in claim 1 wherein the aluminium oxide comprises an aluminium oxide hydrate press cake.

9. A process as in claim 1 wherein the said other compound is mixed with the oxide of copper and chromium before the mixture of the oxide of copper and chromium and the aluminium oxide is formed.

10. A process for preparing a catalyst composition which comprises the sequential steps of separately producing an aluminium oxide hydrate press cake and calcined powdered oxide of copper and chromium selected from the group consisting of copper oxide in a physical mixture with chromium oxide and copper oxide chemically combined with chromium oxide, the particle size of the majority of the oxide of copper and chromium being in the range of 0.5 microns to 5.0 microns, the mixture of and the oxide of copper and chromium contains at least one other compound selected from the group consisting of oxides, chromites and chromates of beryllium, magnesium, calcium, strontium and barium, the quantity of said other compound expressed as the oxide being from 0.5 to 5.0 percent by weight of the oxide of copper and chromium and mole ratio of copper oxide to chromium oxide being from 1.2 to 2.2:1, mixing the aluminium oxide hydrate and the oxide of copper and chromium containing said other compound, the aluminium oxide hydrate expressed as $Al_2O_3$ being present in from 20 to 45 percent by weight of the aluminium oxide, oxide of copper and chromium and said other compound expressed as the oxide, drying the mixture, grinding the mixture into particle sizes below $100\mu$, treating the ground mixture with an acid selected from the group consisting of mineral acids and aliphatic carboxylic acids, moulding the acid treated mixture and calcining it at a temperature in the range of 700° to 1,000° C.

11. A process as claimed in claim 10 wherein the said other compound is selected from the group consisting of the oxides, chromites and chromates of barium.

12. A process as claimed in claim 11 wherein the said other compound is barium oxide and the mole ratio of copper to chromium to barium expressed as oxides is 1.2 to 2.2:1:0.01 to 0.1.

13. A process as claimed in claim 10 wherein the ground mixture is treated with an acid selected from the group consisting of hydrochloric acid, sulphuric acid, nitric acid, lactic acid, acetic acid, citric acid and propionic acid.

14. A process as claimed in claim 5, wherein the quantity of acid may be from 5 – 100 ml/1 kg of ground product, when using a concentrated mineral acid, and 50 – 300 ml/1 kg of ground product, when using a concentrated aliphatic carboxylic acid.

15. An oxidation catalyst for use in the purification of exhaust gases issuing from motor vehicles and industrial plants consisting essentially of moldings of a mixture selected from the group consisting of:
    a. A mixture of aluminum oxide and an oxide of copper and chromium, the aluminum oxide being present in from 20 to 45 percent of the total weight of aluminum oxide and oxides of copper and chromium, and b. A mixture of aluminum oxide, an oxide of copper and chromium and at least one other compound, the other compound being selected from the group consisting of:
  i. Oxides, chromites and chromates of beryllium,
  ii. Oxides, chromites and chromates of magnesium,
  iii. Oxides, chromites and chromates of calcium,
  iv. Oxides, chromites and chromates of strontium,
  v. Oxides, chromites and chromates of barium, wherein the aluminum oxide is present in from 20 to 45 percent of the total weight of aluminum oxide, oxide of copper and chromium and said other compound expressed as the oxide, and said other compound expressed as an oxide being present in not more than 5 percent by weight of said copper and chromium, the mole ratio of copper oxide to chromium oxide being from 1.2 to 2.2:1 and the particle size of the majority of the oxide of copper and chromium being in the range of 0.5 microns to 5.0 microns said moldings having been formed by A. separately producing
  1. said aluminum oxides being selected from the group consisting of
    i. aluminum oxide of the gamma form and
    ii. aluminum oxide hydrate, and
  2. said oxide of copper and chromium in calcined powdered form and selected from the group consisting of
    i. copper oxide in physical admixture with chromium oxide, and,
    ii. copper oxide chemically combined with chromium oxide, B. forming a moist mixture selected from the group consisting of
  1. mixture of said aluminum oxide and said oxide of copper and chromium, the aluminum oxide being present in from 20 to 45 percent of the total weight of aluminum oxide and oxide of copper and chromium, and
  2. a mixture of said aluminum oxide, said oxide of copper and chromium and at least one other compound, the other compound being selected from a group consisting of
    i. oxides, chromites and chromates of beryllium,
    ii. oxides, chromites and chromates of magnesium,
    iii. oxides, chromites and chromates of calcium,
    iv. oxides, chromites and chromates of strontium and
    v. oxides, chromites and chromates of barium, C. drying the mixture, and
D. molding the dried mixture,
E. calcining the resulting molded product at a temperature of from 700° to 1,000° C.

16. A catalyst composition as claimed in claim 15 wherein said at least one other compound is barium oxide.

17. A catalyst composition according to claim 15 wherein the molar ratio of copper to chromium to barium expressed as oxides is 1.2 to 2.2:1:0.01 to 0.1.

18. A catalyst composition according to claim 15 wherein the aluminum oxide is present in from 20 to 40 percent of the weight of aluminium oxide, aluminium of copper and chromium and said other compound expressed as the oxide.

* * * * *